United States Patent
Audinot

(10) Patent No.: US 7,466,968 B2
(45) Date of Patent: Dec. 16, 2008

(54) METHOD AND APPARATUS FOR PROVIDING A LOCAL OSCILLATOR SIGNAL

(75) Inventor: Pascal Audinot, Valbonne (FR)

(73) Assignee: Texas Instruments Incorporated, Dallas, TX (US)

( * ) Notice: Subject to any disclaimer, the term of this patent is extended or adjusted under 35 U.S.C. 154(b) by 860 days.

(21) Appl. No.: 09/962,417

(22) Filed: Sep. 25, 2001

(65) Prior Publication Data
US 2002/0049046 A1 Apr. 25, 2002

(30) Foreign Application Priority Data
Oct. 19, 2000 (EP) ................... 00402902

(51) Int. Cl.
*H04B 1/06* (2006.01)
*H03D 1/00* (2006.01)
(52) U.S. Cl. .................. 455/265; 455/168.1; 455/188.1
(58) Field of Classification Search ............. 455/75–76, 455/83–86, 147, 168.1, 180.1, 188.1, 189.1, 455/216, 264–265, 552.1; 375/316, 335, 375/339
See application file for complete search history.

(56) References Cited

U.S. PATENT DOCUMENTS 6,484,014 B1 * 11/2002 Koszarsky .................. 455/86
6,484,038 B1 * 11/2002 Gore et al. ................ 455/552.1
6,574,462 B1 * 6/2003 Strange ..................... 455/318
6,658,237 B1 * 12/2003 Rozenblit et al. .......... 455/83
6,690,949 B1 * 2/2004 Shamlou et al. ............ 455/557
6,766,178 B1 * 7/2004 Damgaard et al. ......... 455/552.1

OTHER PUBLICATIONS

Web Page, Philips Semiconductors: Product Information on UAA3535HL, Sep. 22, 2000, pp. 1-2.
Data Sheet, Philips Semiconductors, UAA3535HL Low Power GSM/DCS/PCS Multi-Band Transceiver, Feb. 17, 2000, pp. 1-24.

* cited by examiner

*Primary Examiner*—Melur Ramakrishnaiah
(74) *Attorney, Agent, or Firm*—Ronald O. Neerings; Wade James Brady, III; Frederick J. Telecky, Jr.

(57) ABSTRACT

A multi-band RF transceiver (100) includes a single dual band VCO (102) that is used in both transmit and receive modes of operation. The VCO's low band frequency output signal that is provided on output line (120) is multiplied by two by multiplier circuit (1302), when in the high band receive mode, as for example, when receiving a PCS or DCS signal. The VCO's high band frequency output signal provided on output line (120) is divided by two by divider circuit (130) when in the low band receive mode, as for example, when receiving a GSM signal. The single multi-band VCO (102) design provides for low susceptibility to both LO leakage and DC offset caused by radiation.

9 Claims, 1 Drawing Sheet dance with the invention. In accordance with the preferred
METHOD AND APPARATUS FOR PROVIDING A LOCAL OSCILLATOR SIGNAL

TECHNICAL FIELD

This invention relates in general to the field of radio communications and more specifically to a method and apparatus for providing a local oscillator signal.

BACKGROUND

Most of the current Global Systems for Mobile communication (GSM) radio frequency (RF) transmitter architectures are based on the modulation loop architecture. While for receiver architectures, the trend is to adopt the direct conversion architecture, in order to achieve higher integration levels. Higher integration levels are achieved in direct conversion architectures due to not having to use intermediate frequency (IF) and image rejection filters.

With the move towards greater and greater integration levels, some RF semiconductor manufacturers are providing multi-band transceiver integrated circuits that integrate the receiver and most of the transmitter sections for use in handheld or mobile applications. One example of such a multi-band transceiver IC is the UAA3535HL low power GSM/DCS/PCS multi-band transceiver, manufactured by Philips Semiconductors. This IC provides GSM, Digital Cellular communication Systems (DCS) and Personal Communication Services (PCS) support. Like the UAA3525HL multi-band transceiver IC, most current RF transceiver solutions currently available require two external dual band voltage-controlled oscillators (VCOs). One external multi-band VCO is required for the transmitter section and one external multi-band VCO is required for the receiver section. This of course not only adds to the cost of the design, but also increases the area needed to implement the design. A need thus exist in the art, for a solution to the abovementioned multi-VCO problem.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
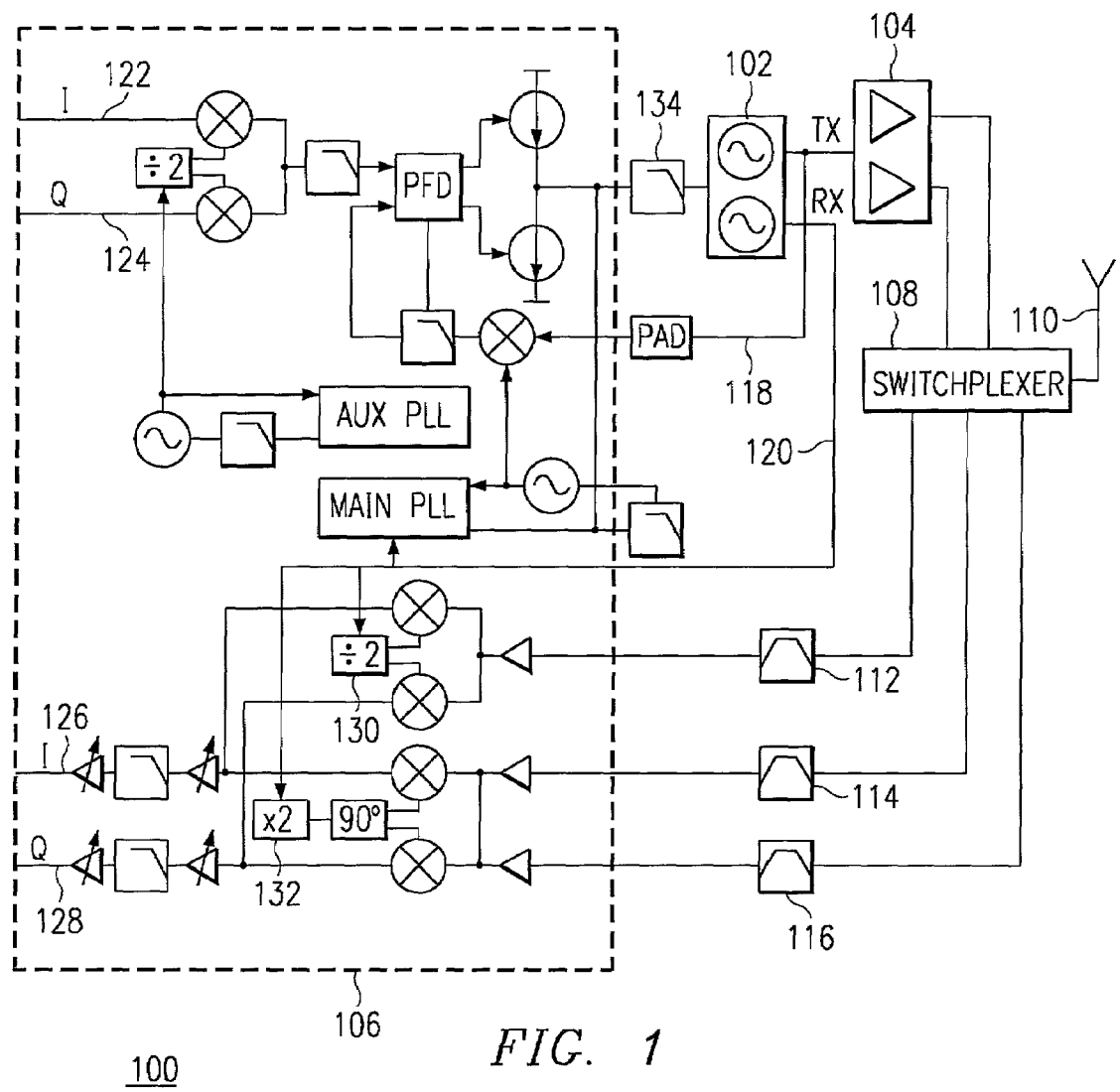
FIG. 1 shows a simplified block diagram of a radio transceiver in accordance with the invention.

While the specification concludes with claims defining the features of the invention that are regarded as novel, it is believed that the invention will be better understood from a consideration of the following description in conjunction with the drawing figures, in which like reference numerals are carried forward.

In order to comply with the spurious emission specifications in the receive band required by the GSM standard, the dual band VCO has to meet severe phase noise performance requirements which are −165 dBc/Hz at 20 MHz offset in the low band and −154 dBc/Hz @ 20 MHz in the high band. For the receiver section, the design of a direct conversion receiver suffers from some problems. One problem associated with the direct conversion architecture is that the I and Q demodulator local oscillator (LO) signal may leak up to the antenna since there is no rejection coming from the low noise amplifiers (LNAs) and front end filters which are matched to the same frequency. Another problem 15 is that a parasitic DC offset superimposed on the down-converted wanted signal is generated by self mixing of the LO or an RF interferer signal, since the mixers LO and RF are operating at the same frequency. One other problem associated with the direct conversion architecture is that since the image rejection filters are removed, at the I/Q demodulator mixers' RF port, out-of-band blocking signals are larger than in-band blocking signals, which makes the LO signal phase noise requirements very stringent because of reciprocal mixing effects.

The present invention uses the dual band VCO already needed in the transmitter architecture for receive operation as well. Since DCS and PCS operating frequencies are almost twice the GSM frequencies, in high band receive mode, the low band VCO frequency is multiplied by two to generate the local oscillator (LO) signal. In the low band receive mode the high band VCO frequency is divided by two.

Benefits of using the same VCO for both transmit and receive operations as provided by the present invention include reduced external part count requirements since only one external dual band VCO is needed. The receiver section is also less susceptible to LO leakage due to radiation since the VCO is not operating at the same frequency as the wanted signal. Furthermore, the receiver is less susceptible to DC offset by radiation since the dual band VCO is not operating at the same frequency as the wanted signal.

With the switched VCO design of the present invention, the receiver section becomes less susceptible to DC offset due to coupling by radiation. Also, this concept takes advantage of the low phase noise requirement in transmit mode to meet the low phase noise constraint in receive mode.

Referring now to FIG. 1, there is shown a simplified block diagram of a radio frequency (RF) transceiver 100 in accordance with the invention. In accordance with the preferred embodiment, a dual band VCO 102 is coupled to a transceiver block 106 having a receiver and a transmitter section. The transmit path output of the VCO 102 is coupled to a dual band power amplifier 104 which has its output switchably coupled to antenna 110 by switchplexer 108. In the receive path front-end, three parallel band-pass filters 112, 114 and 116 are provided. Filter 112 is provided for the GSM receive frequency range of 925-960 MHz, filter 114 is provided for the PCS receive frequency range of 1930-1990 MHz and filter 116 is provided for the DCS receive frequency range of 1805-1880 MHz.

Located inside of the transceiver block 106 is a set of LNA's one coupled to each of the band-pass filters 112-116. The transceiver block 106 takes I 122 and Q 124 signals at the input to the transmitter and processes the signals for transmission. While the receiver section provides I 126 and Q 128 signals to the rest of the transceiver (not shown) for presentation in the form of audio or data. In accordance with the preferred embodiment, when in a first or high band receive mode for either PCS (1930-1990 MHz) or DCS (1805-1880 MHz) reception, the low band VCO frequency (880-995 MHz) output signal provided on line 120 is multiplied by a factor "X", in this case, by a factor of 2 (two) by multiplier circuit 132 in order to generate the required receive LO signal. While in a second or low band receive mode for GSM (925-960 MHz), the high band VCO frequency (1760-1990 MHz) signal provided on line 120 by dual band VCO 102 is divided by factor "Y", in this case, by a factor of 2 (two) by divider circuit 130 in order to generate the required LO for GSM operation.

Compared to a VCO solely dedicated to the transmitter, the tuning range of dual band VCO 102 has to be extended. Also, it is preferable to have two programmable output power levels in order to optimize the current consumption in transmit and receive modes. In order to simplify the VCO design, one single voltage control line is also desirable. As such the loop filter 134 has to be programmable and exhibit two different bandwidths depending when in receive (approximately 50 kHz) or when in transmit (approximately 1 MHz) operating mode. Switching the main phase-locked-loop (PLL) and modulation loop charge pumps and switching internally the loop filter resistors to different values can accomplish this. Although not shown in the simplified block diagram of FIG. 1, either the internal low band or high band receive mixer stages are selectively switched into the receive path depending on the band of operation by the transceiver's 100 controller (not shown).

Figure 2:
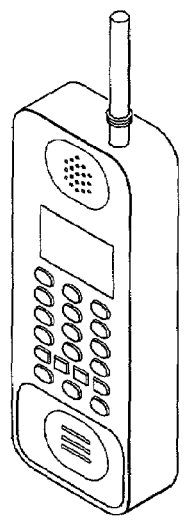
FIG. 2 shows a radio in accordance with the invention.

The architecture of the present invention takes advantage of the low phase noise requirement for the multi-band GSM/DCS/PCS transceiver in transmit mode to meet the low phase noise constraints in receive mode. Given the single dual band VCO design of the present invention, the receiver section becomes less susceptible to DC offset due to coupling by radiation. As previously mentioned, the design also reduces the susceptibility to LO signal leakage caused by radiation. Also, the design minimizes the number of external VCOs required and helps further increase the integration level of the transceiver. In FIG. 2, there is shown a multi-band radiotelephone that uses the RF transceiver 100 of the present invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A radio frequency transceiver, comprising:
  a single multi-band voltage controlled oscillator (VCO) providing a low band VCO frequency output signal and a high band VCO frequency output signal for use by the transmitter portion of the transceiver;
  a multiplier circuit for multiplying the low band VCO frequency output signal by a factor X, and producing a first local oscillator signal for use by a direct conversion receiver portion of the transceiver when the receiver is operating in a first receive mode in which the multi-band VCO is not operating at the same frequency as the frequency wanted by the receiver portion; and
  a divider circuit for dividing the high band VCO frequency signal by a factor Y and producing a second local oscillator signal for use by the receiver portion when the receiver portion is operating in a second receive mode in which the multi-band VCO is not operating at the same frequency as the frequency wanted by the receiver portion.

2. A radio frequency transceiver as defined in claim 1, wherein the first receive mode comprises operating in the Personal Communication Services (PCS) receive band or the Digital Cellular Communications Systems (DCS) receive band.

3. A radio frequency transceiver as defined in claim 2, wherein the second receive mode comprises operating in the Global Systems for Mobile communications (GSM) receive band.

4. A radio frequency transceiver as defined in claims 1 through 3, wherein the low band VCO frequency output signal is in the range of 880 to 995 MHz, and the high band VCO frequency output signal is in the range of 1760-1920 MHz.

5. A radio frequency transceiver as defined in claim 1 through 3, wherein the factors X and Y are both equal to two.

6. A radio frequency transceiver as defined in claim 1-3, further including a programmable loop filter coupled to the multi-band VCO, the loop filter programmable between a first bandwidth when the transceiver is in the receive mode and a second bandwidth when the transceiver is in the transmit mode.

7. A radio frequency transceiver as defined in claim 6, wherein the loop filter's first bandwidth is approximately 50 kHz and the second bandwidth is approximately 1 MHz.

8. A method of generating a receiver local oscillator (LO) signal in a transceiver having a single multi-band voltage controlled oscillator (VCO) providing a low band VCO frequency output signal and a high band VCO frequency output signal for use by a transmitter portion of the transceiver comprising the steps of:
  multiplying the low band VCO frequency output signal by a factor X and providing a first local oscillator signal for use by a direct conversion receiver in the transceiver when the receiver is operating in a first receive mode in which the multi-band VCO is not operating at the same frequency as the frequency wanted by the receiver; and
  dividing the high band VCO frequency signal by a factor Y and producing a second local oscillator signal for use by the receiver when the receiver is operating in a second receive mode in which the multi-band VCO is not operating at the same frequency as the frequency wanted by the receiver section.

9. A method as defined in claim 8, wherein the first receive modes comprises operating in the Personal Communication Services (PCS) receive band or the Digital Cellular Communication Systems (DCS) receive band, and the low band VCO frequency output signal is used when transmitting in the Global Systems for Mobile communications (GSM) transmit band.

* * * * *